US012732066B2

(12) United States Patent
Morimoto

(10) Patent No.: US 12,732,066 B2
(45) Date of Patent: Sep. 8, 2026

(54) LINEAR MOTOR AND MACHINE TOOL

(71) Applicant: DMG MORI CO., LTD., Nara (JP)

(72) Inventor: Ryota Morimoto, Nara (JP)

(73) Assignee: DMG MORI CO., LTD., Nara (JP)

( * ) Notice: Subject to any disclaimer, the term of this patent is extended or adjusted under 35 U.S.C. 154(b) by 204 days.

(21) Appl. No.: 18/569,627

(22) PCT Filed: Feb. 2, 2023

(86) PCT No.: PCT/JP2023/003353
§ 371 (c)(1),
(2) Date: Dec. 13, 2023

(87) PCT Pub. No.: WO2024/161584
PCT Pub. Date: Aug. 8, 2024

(65) Prior Publication Data

US 2025/0096647 A1 Mar. 20, 2025

(51) Int. Cl.

| | |
|---|---|
| ***H02K 9/193*** | (2006.01) |
| ***H02K 7/14*** | (2006.01) |
| ***H02K 41/02*** | (2006.01) |
| ***H02K 41/03*** | (2006.01) |

(52) U.S. Cl.
CPC ............... *H02K 9/193* (2013.01); *H02K 7/14* (2013.01); *H02K 41/02* (2013.01)

(58) Field of Classification Search
CPC ............ H02K 9/193; H02K 9/19; H02K 7/14; H02K 2209/00; H02K 41/02; H02K 41/03; H02K 41/031
USPC ............................... 310/12.27, 12.29, 54, 58
See application file for complete search history.

(56) References Cited

U.S. PATENT DOCUMENTS

2011/0109095 A1* 5/2011 Stiesdal .................... F03D 9/25 290/55
2013/0228415 A1* 9/2013 Iwasaki .................. B65G 35/00 198/339.1

(Continued)

FOREIGN PATENT DOCUMENTS

JP 2014042423 A 3/2014
KR 101367734 B1 * 3/2014 ........... H02K 41/031

OTHER PUBLICATIONS

Machine translation of KR-101367734-B1. (Year: 2014).*

*Primary Examiner* — Michael Andrews
(74) *Attorney, Agent, or Firm* — Renner, Otto, Boisselle & Sklar, LLP

(57) ABSTRACT

A linear motor includes a magnet plate including magnets arranged side by side in a first direction, a slider configured to slide in the first direction, and a cooling pipe provided at a surface portion. Grooves and ridges alternate in the first direction. The grooves are elongated in a second direction that is parallel to a surface of the magnet plate and orthogonal to the first direction. The ridges are elongated in the second direction. The cooling pipe is routed to wind back and forth through the grooves. On a side in the second direction, a first end portion of each of the ridges is entirely located inward of two end faces in the second direction, or a portion of the first end portion, excluding a central portion of the first end portion, is located inward of the two end faces of the slider in the second direction.

9 Claims, 17 Drawing Sheets

(56) References Cited

U.S. PATENT DOCUMENTS

2014/0054979 A1* 2/2014 Sugita ..................... H02K 9/20
310/12.29
2016/0118872 A1* 4/2016 Chen ................... H02K 41/031
310/12.24

* cited by examiner

LINEAR MOTOR AND MACHINE TOOL

This application is a national phase of International Application No. PCT/JP2023/003353 filed Feb. 2, 2023, which is hereby incorporated herein by reference in its entirety.

TECHNICAL FIELD

The present disclosure relates to a linear motor and a machine tool.

BACKGROUND ART

JP 2014-042423A (Patent Document 1) discloses an invention related to a linear motor. This linear motor includes a magnetic field unit that functions as a stator and an armature that functions as a mover. The armature has a core, coils, and a cooling pipe. The armature generates driving force associated with electromagnetic induction by application of current to the coils, and moves over the magnetic field unit.

The core is the member that forms the main body of the armature. Housing holes that penetrate in the widthwise direction are formed inside the core. The cooling pipe is routed so as to wind back and forth through the housing holes. As a result, the cooling pipe protrudes from the core in the widthwise direction.

CITATION LIST

Patent Document

Patent Document 1: JP 2014-042423A

SUMMARY OF INVENTION

Technical Problem

If the cooling pipe protrudes a large amount from the core in the widthwise direction, the size of the linear motor in the widthwise direction increases. Therefore, a technique for reducing the size of the linear motor in the widthwise direction is desired.

Solution to Problem

According to one example of the present disclosure, there is provided a linear motor for use in a machine tool. The linear motor comprises a magnet plate including a plurality of magnets arranged side by side in a first direction, a slider including a plurality of coils arranged side by side in the first direction, and configured to slide in the first direction relative to the magnet plate, and a cooling pipe provided at a surface portion of the slider on a side opposite to a side facing the magnet plate. The surface portion is provided with a plurality of grooves and a plurality of ridges that alternate in the first direction. The grooves are each elongated in a second direction that is parallel to a surface of the magnet plate and orthogonal to the first direction. The ridges are each elongated in the second direction. The cooling pipe is routed on the slider so as to wind back and forth through the grooves. Each of the ridges has two end portions in the second direction including a first end portion on a side along which a bent portion of the cooling pipe extends, and on at least one side in the second direction, each of the first end portions is entirely located inward of two end faces of the slider in the second direction, or a portion of each of the first end portions, excluding a central portion of the first end portion in the first direction, is located inward of the two end faces of the slider in the second direction.

According to one example of the present disclosure, on both sides in the second direction, each of the first end portions is entirely located inward of the two end faces of the slider in the second direction, or a portion of each of the first end portions, excluding the central portion of the first end portion in the first direction, is located inward of the two end faces of the slider in the second direction.

According to one example of the present disclosure, the two end portions of each of the ridges further include a second end portion on a side along which a bent portion of the cooling pipe does not extend, and the second end portions are each located at the same position as one of the two end faces when viewed in a third direction orthogonal to both the first direction and the second direction.

According to one example of the present disclosure, bent portions of the cooling pipe are located outward of the two end faces when viewed in a third direction orthogonal to both the first direction and the second direction.

According to one example of the present disclosure, end portions of the cooling pipe in the second direction overlap end portions of the coil in the second direction when viewed in a third direction orthogonal to both the first direction and the second direction.

According to one example of the present disclosure, a width of the cooling pipe in the second direction is longer than a width of each of the coils in the second direction.

According to another example of the present disclosure, there is provided a machine tool. The machine tool comprises the linear motor, and a spindle configured to rotatably hold a workpiece or a tool. The linear motor is used to move a position of the spindle.

According to another example of the present disclosure, there is provided a machine tool. the machine tool comprises the linear motor, and a table on which a workpiece is placeable. The linear motor is used to drive the table.

According to another example of the present disclosure, there is provided a machine tool. The machine tool comprises the linear motor, and a loader configured to transport a member. The linear motor is used to drive the loader.

These and other objects, features, aspects and advantages of the present invention will become apparent from the following detailed description of the invention, taken in conjunction with the accompanying drawings.

DESCRIPTION OF EMBODIMENTS

Figure 1:
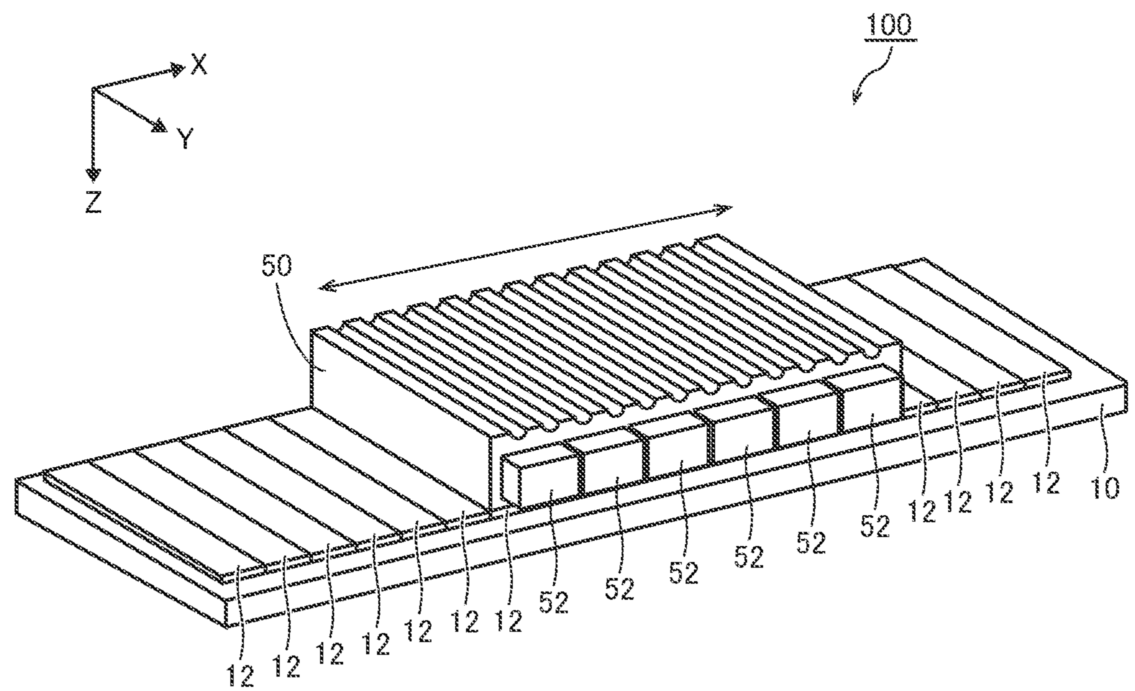
FIG. 1 is an oblique perspective view of a linear motor according to an embodiment.

Hereinafter, each embodiment according to the present invention will be described with reference to the drawings. In the following description, the same parts and constituent elements are denoted by the same reference numerals. Their names and functions are also the same. Therefore, detailed description of these will not be repeated. Note that each embodiment and each modification described below may be selectively combined as appropriate.

A. Linear Motor 100

First, an overview of a linear motor 100 will be described with reference to FIG. 1. FIG. 1 is an oblique perspective view of the linear motor 100 according to this embodiment.

As shown in FIG. 1, the linear motor 100 includes a magnet plate 10 and a slider 50.

The magnet plate 10 functions as a stator. A plurality of magnets 12 are arranged side by side on the magnet plate 10. For convenience in the description, the direction in which the magnets 12 are next to each other will hereinafter also be referred to as the X-axis direction (first direction). The direction parallel to the surface of the magnet plate 10 and orthogonal to the X-axis direction will also be referred to as the Y-axis direction (second direction). The direction orthogonal to both the X-axis direction and the Y-axis direction will also be referred to as the Z-axis direction (third direction).

The magnets 12 are spaced apart by a predetermined gap in the X-axis direction on the magnet plate 10. The magnets 12 are each a permanent magnet. The magnets 12 are provided on the magnet plate 10 such that the polarities of adjacent magnets 12 are opposite to each other. For example, assume that the top surface of one magnet 12 is the N pole and the bottom surface of that one magnet 12 is the S pole. In this case, the magnet 12 arranged adjacent to the one magnet 12 has an S pole on the top surface and an N pole on the bottom surface.

The slider 50 functions as a mover. The slider 50 includes a plurality of coils 52. The coils 52 are provided side by side in the X-axis direction in the slider 50. The coils 52 are wound in an oval shape around later-described teeth 53 (see FIG. 3) formed in the slider 50.

The coils 52 are provided in the slider 50 so as to face the magnets 12. In other words, the coils 52 are provided in the slider 50 so as to overlap the magnets 12 when viewed in the Z-axis direction.

When a magnetic field, which is generated by applying alternating current to the coils 52, acts on the magnets 12, the slider 50 receives thrust and slides in the X-axis direction over the magnet plate 10. The alternating current is supplied by a power supply (not shown) that is electrically connected to the coils 52, for example.

B. Slider 50

Figure 2:
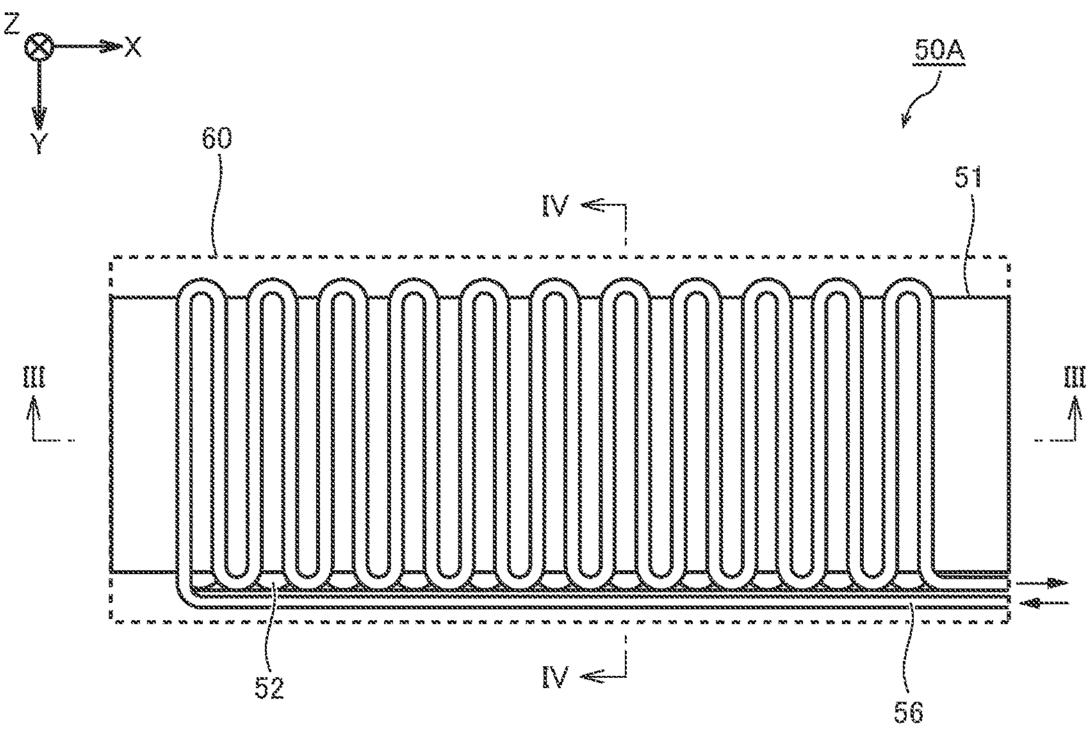
FIG. 2 is a diagram illustrating a slider from the Z-axis direction.
Figure 3:
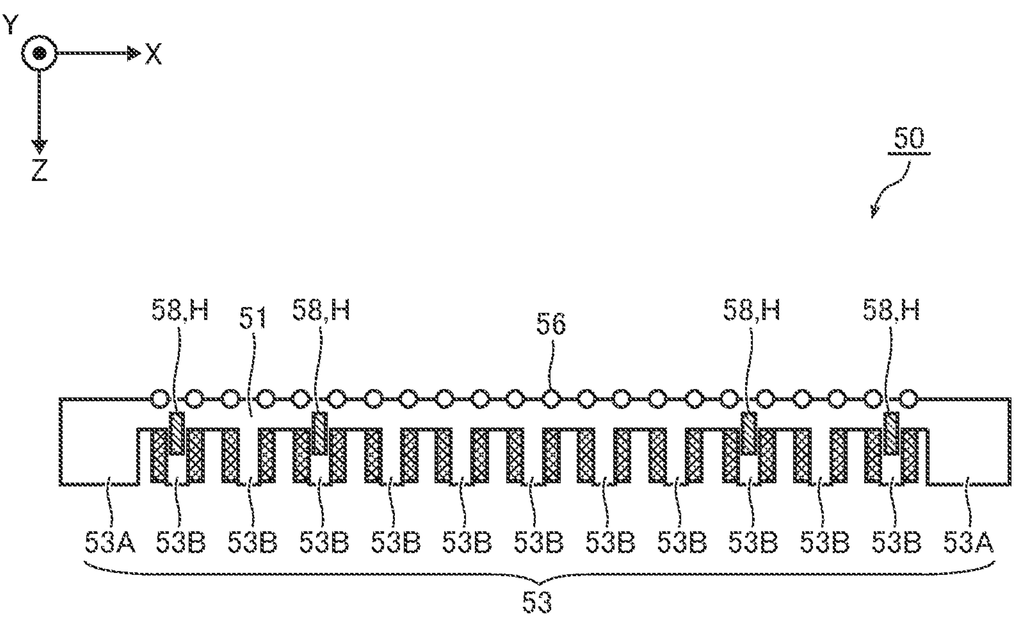
FIG. 3 is a cross-sectional view of the slider taken along line III-III shown in FIG. 2.
Figure 4:
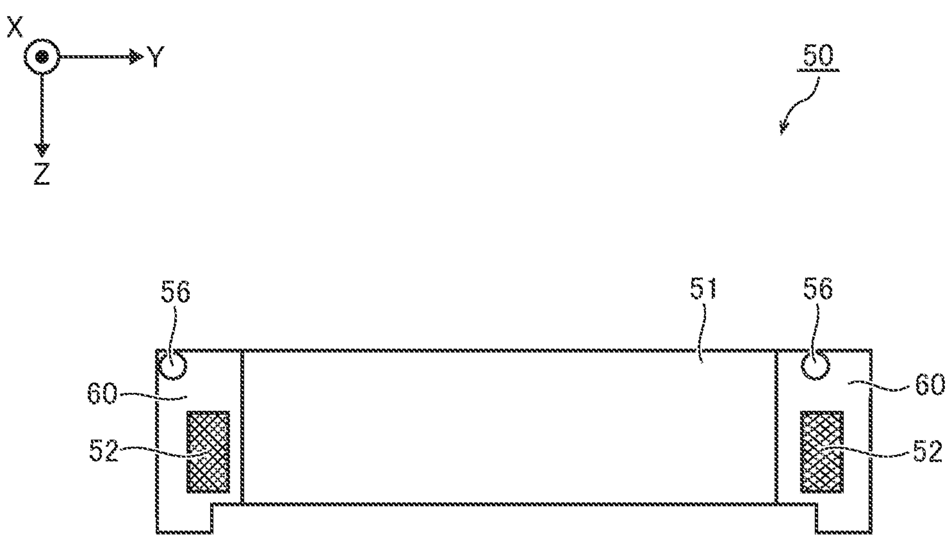
FIG. 4 is a cross-sectional view of the slider taken along line IV-IV shown in FIG. 2.

Next, the aforementioned slider 50 will be described in further detail with reference to FIGS. 2 to 4. FIG. 2 is a diagram illustrating the slider 50 from the Z-axis direction. FIG. 3 is a cross-sectional view of the slider 50 taken along line III-III shown in FIG. 2. FIG. 4 is a cross-sectional view of the slider 50 taken along line IV-IV shown in FIG. 2.

The slider 50 includes a housing 60 that gives it its appearance. The housing 60 is made of resin, for example. A slider core 51, the coils 52, a cooling pipe 56, and fixing members 58 are housed in the housing 60.

The slider core 51 is constituted by an electromagnetic steel plate, for example. Teeth 53 are formed on the slider core 51.

The teeth 53 protrude from the lower surface of the slider core 51 (i.e., the surface portion on the side facing the magnet plate 10) toward the magnet plate 10. In other words, the teeth 53 are formed on the slider core 51 so as to face the above-described magnet plate 10 and overlap the magnet plate 10 when viewed in the Z-axis direction. Moreover, the teeth 53 are each elongated in the Y-axis direction.

The teeth 53 include auxiliary teeth 53A that are located most outward in the X-axis direction and do not have coils 52 wrapped thereon, and coil teeth 53B that are located inward of the auxiliary teeth 53A in the X-axis direction and have coils 52 wrapped thereon. The coils 52 are wound in an oval shape around the coil teeth 53B.

Through holes H elongated in the Y-axis direction are formed in some of the coil teeth 53B. The fixing members 58 are respectively inserted into the through holes H. A threaded hole extending in the Z-axis direction is formed in each of the fixing members 58, and the through holes H in the slider core 51 are formed so as to be in communication with the threaded holes of the fixing members 58 in the Z-axis direction.

The fixing members 58 may have any shape. For example, the fixing members 58 may be shaped as a cuboid rectangular bar, a circular column, or any other shape.

The fixing members 58 are constituted by a different type of member from the slider core 51. For example, the slider core 51 is constituted by a laminated steel plate, and the fixing members 58 are formed using a metal other than the metal forming the laminated steel plate. For example, the fixing members 58 may be made of iron, or may be made of another type of metal.

The cooling pipe 56 is provided on the side opposite to the side that faces the magnet plate 10. The cooling pipe 56 has a coolant inlet and a coolant outlet. The inlet and the outlet are connected to a cooler (not shown). The coolant flows from the inlet of the cooling pipe 56 to the outlet of the cooling pipe 56 and cools the slider 50. Upon reaching the outlet, the coolant is sent to the cooler and cooled. After that, the cooled coolant is sent to the inlet of the cooling pipe 56 again. In this manner, the coolant circulates along the upper surface of the slider core 51 and absorbs heat from the slider 50. As one example, the coolant is a liquid including water or the like.

The cooling pipe 56 is constituted by a metal pipe that has good thermal conductivity, for example. For example, the cooling pipe 56 may be made of a copper pipe, an aluminum pipe, or a stainless steel pipe.

Note that although FIG. 3 illustrates an example in which the cooling pipe 56 has a circular cross-sectional shape, the cooling pipe 56 may have any cross-sectional shape. The cooling pipe 56 may have a polygonal cross-sectional shape, for example, or any other cross-sectional shape.

C. Slider Core 51

Figure 5:
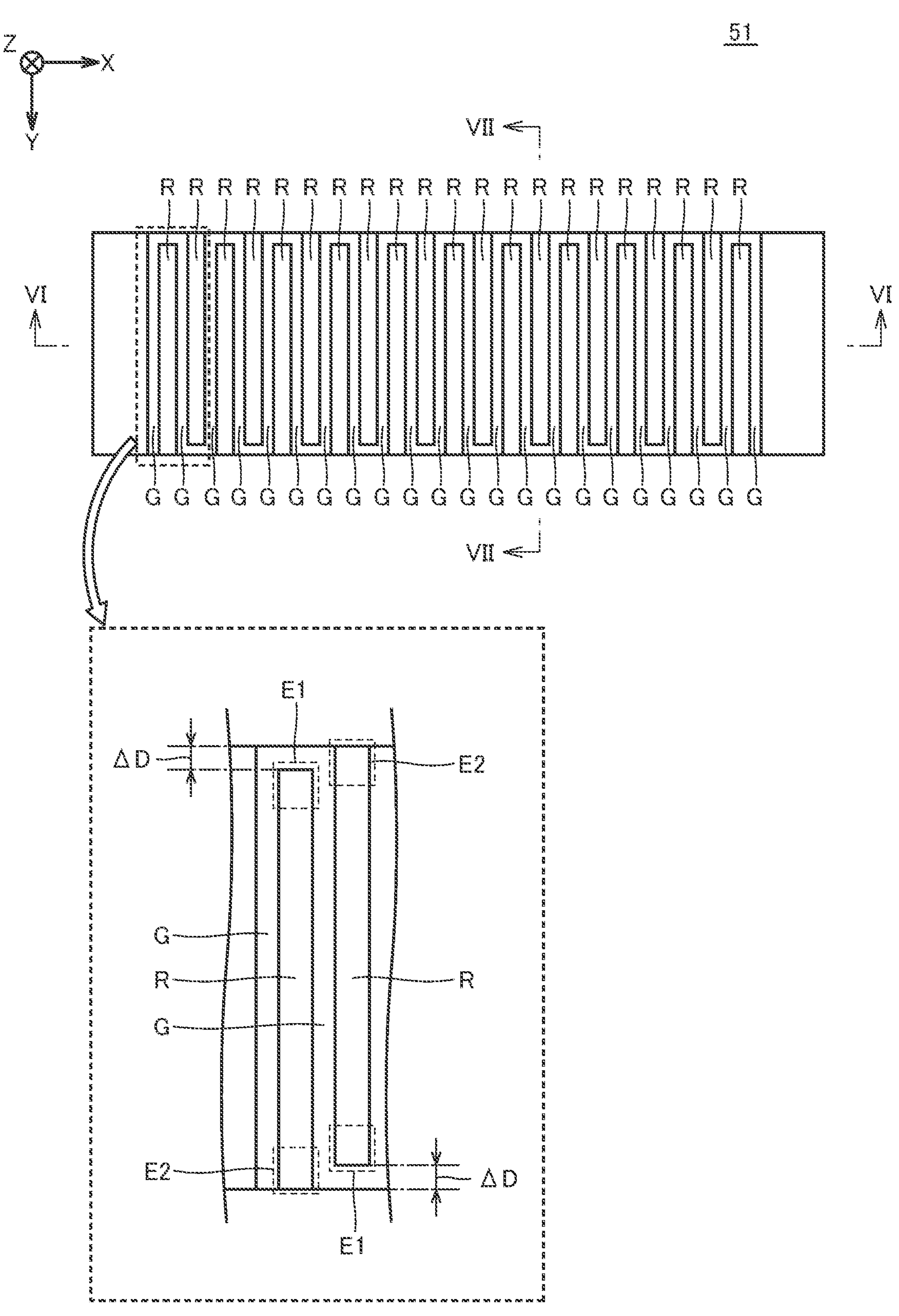
FIG. 5 is a diagram illustrating a slider core from the Z-axis direction.
Figure 6:
FIG. 6 is a cross-sectional view of the slider core taken along line VI-VI shown in FIG. 5.
Figure 6:
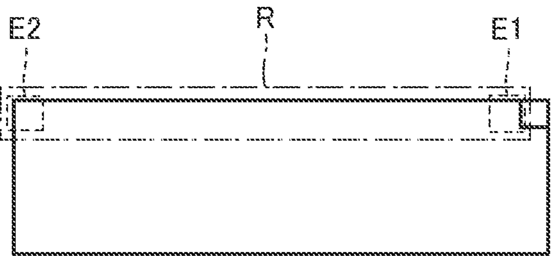
Figure 7:
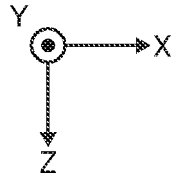
FIG. 7 is a cross-sectional view of the slider core taken along line VII-VII shown in FIG. 5.
Figure 7:
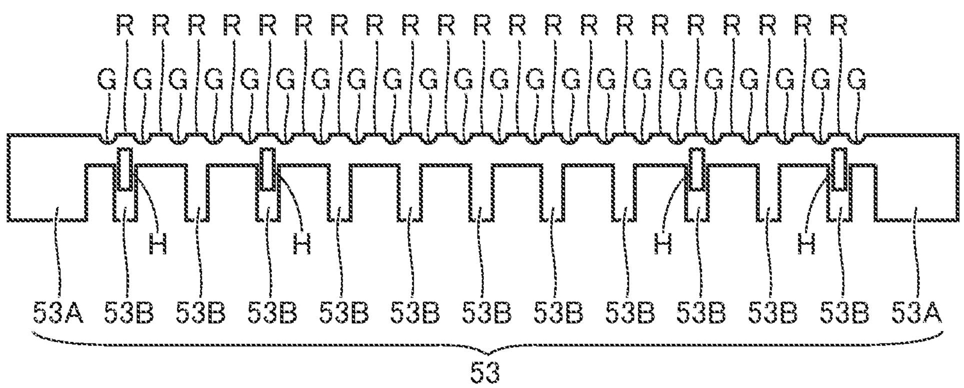

Next, the aforementioned slider core 51 will be described in further detail with reference to FIGS. 5 to 9. FIG. 5 is a diagram illustrating the slider core 51 from the Z-axis direction. FIG. 6 is a cross-sectional view of the slider core 51 taken along line VI-VI shown in FIG. 5. FIG. 7 is a cross-sectional view of the slider core 51 taken along line VII-VII shown in FIG. 5.

The surface portion of the slider core 51 on the side opposite to the side facing the magnet plate 10 is provided with grooves G and ridges R that alternate in the X-axis direction.

The grooves G are formed at regular intervals in the X-axis direction. The grooves G are elongated in the Y-axis direction. The cooling pipe 56 described above is routed so as to wind back and forth through the grooves G. The length of each groove G in the Y-axis direction is the same as the length of the slider core 51 in the Y-axis direction. In other words, when viewed in the Z-axis direction, the two end portions of each groove G in the Y-axis direction are at the same positions as the two end faces of the slider core 51 in the Y-axis direction.

Note that although FIG. 7 shows an example in which the grooves G have a semicircular cross-sectional shape, the grooves G may have any cross-sectional shape. For example, the cross-sectional shape may be polygonal or another shape.

The ridges R are formed at regular intervals in the X-axis direction. The ridges R are elongated in the Y-axis direction. Furthermore, the ridges R protrude from the slider core 51 toward the side opposite to the side facing the magnet plate 10. Each of the grooves G is formed by two adjacent ridges R.

In the following description, out of the two end portions of each of the ridges R in the Y-axis direction, the end portion along which a bent portion of the cooling pipe 56 extends will also be referred to as an "end portion E1". The bent portions of the cooling pipe 56 are each a U-shaped portion that is bent from one side to the other side in the Y-axis direction. Also, out of the two end portions of each of the ridges R in the Y-axis direction, the end portion on the side along which a bent portion of the cooling pipe 56 does not extend will be referred to as an "end portion E2". Since the cooling pipe 56 winds back and forth along the grooves G, the end portions E1 and E2 alternatingly appear in the X-axis direction.

In the present embodiment, the end portions E1 of the ridges R are located inward of the two end faces of the slider 50 in the Y-axis direction. In the example illustrated in FIG. 5, the end portions E1 are located at a distance ΔD away from the end faces of the slider 50. Accordingly, the bent portions of the cooling pipe 56 can be routed at more inward positions on the slider core 51. As a result, the width of the cooling pipe 56 in the Y-axis direction is reduced, and the size of the linear motor 100 in the Y-axis direction is reduced.

Figure 8:
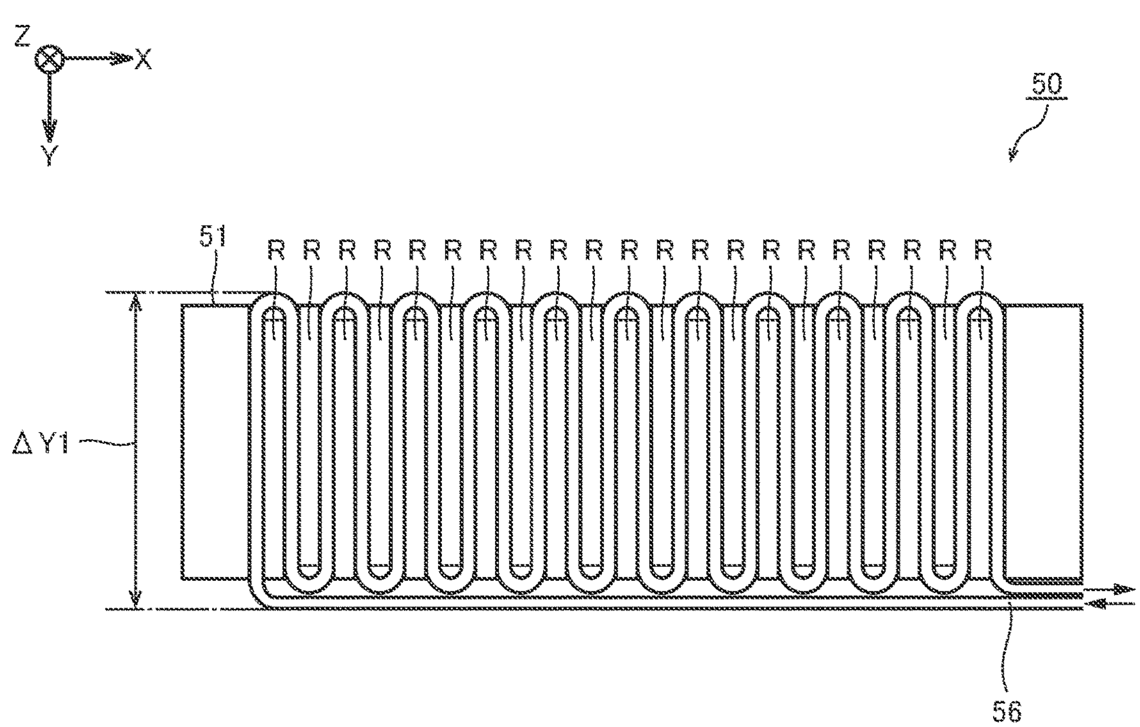
FIG. 8 is a diagram in which a cooling pipe has been provided on the slider core shown in FIGS. 5 to 7.
Figure 9:
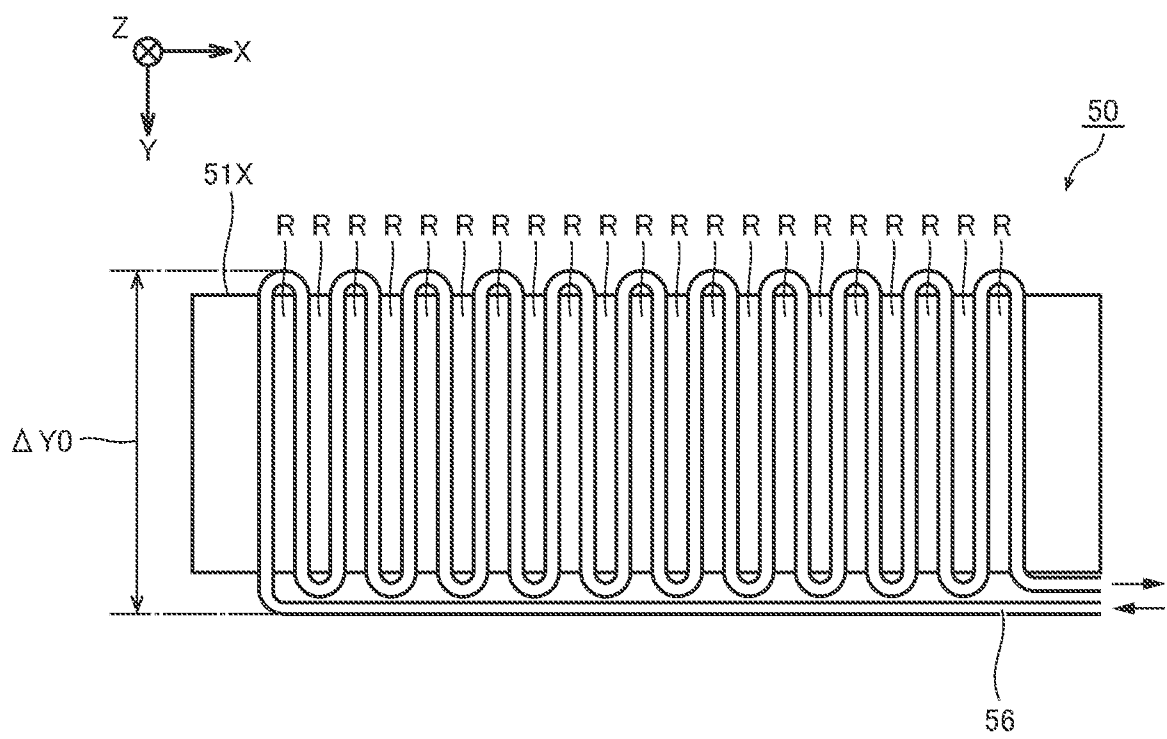
FIG. 9 is a diagram in which a cooling pipe has been provided on a slider core according to a comparative example.

FIG. 8 is a diagram in which the cooling pipe 56 has been provided on the slider core 51 shown in FIGS. 5 to 7. FIG. 9 is a diagram in which the cooling pipe 56 has been provided on a slider core 51X according to a comparative example.

As shown in FIG. 8, in the case where the cooling pipe 56 is routed on the slider core 51 in which the ends of ridges R have been shaved down, the bent portions of the cooling pipe 56 can be routed at more inward positions on the slider core 51. As a result, the width of the linear motor 100 in the Y-axis direction is "ΔY1".

As shown in FIG. 9, in the case where the cooling pipe 56 is routed on the slider core 51X in which the ends of the ridges R have not been shaved down, the bent portions of the cooling pipe 56 protrude a larger amount from the two end faces of the slider core 51X in the Y-axis direction. As a result, the size of the linear motor 100 in the Y-axis direction is "ΔY0". The width "ΔY0" shown in FIG. 9 is larger than the width "ΔY1" shown in FIG. 8.

In this way, the end portions E1 along which the bent portions of the cooling pipe 56 extend are formed inward in the slider core 51, and thus the width of the cooling pipe 56 in the Y-axis direction is reduced. As a result, the size of the linear motor 100 in the Y-axis direction is reduced.

On the other hand, the end portions E2 of the ridges R on the side along which the bent portions of the cooling pipe 56 do not extend may be shaved down or may not be shaved down. In the example shown in FIGS. 5 to 8, the end portions E2 are not shaved down. In this case, the end portions E2 of the ridges R are at the same position as one of the end faces of the slider core 51 in the Y-axis direction when viewed in the X-axis direction. In other words, the end portions E2 are coplanar with the end face of the slider core 51 in the Y-axis direction. By adopting a configuration in which only one end of each of the ridges R is shaved down, the number of shaving locations is reduced.

It is preferable that the effect of cooling the coils 52 is maintained when reducing the size of the cooling pipe 56 in the Y-axis direction. For example, the cooling pipe 56 is routed such that the bent portions are positioned outward of the two end faces of the slider core 51 in the Y-axis direction. In other words, the bent portions of the cooling pipe 56 are routed so as to protrude from the slider core 51 in the Y-axis direction. In this case, the cooling pipe 56 is arranged such that the outer peripheral surfaces of the bent portions are located outward of the end faces, and the inner peripheral surfaces of the bent portions are located inward of the end faces.

Also, the coils 52 are provided such that the end portions thereof are located outward of the two end faces of the slider core 51 in the Y-axis direction. In other words, the coils 52 are provided on the slider core 51 so as to protrude from the slider core 51 in the Y-axis direction. The end portions of the cooling pipe 56 in the Y-axis direction (i.e., the bent portions) overlap the end portions of the coils 52 in the Y-axis direction when viewed in the Z-axis direction. Accordingly, the cooling pipe 56 can cool the end portions of the coils 52 as well. As a result, it is possible to suppress deterioration of the performance of the linear motor 100 caused by generated heat.

D. Variation 1

Figure 10:
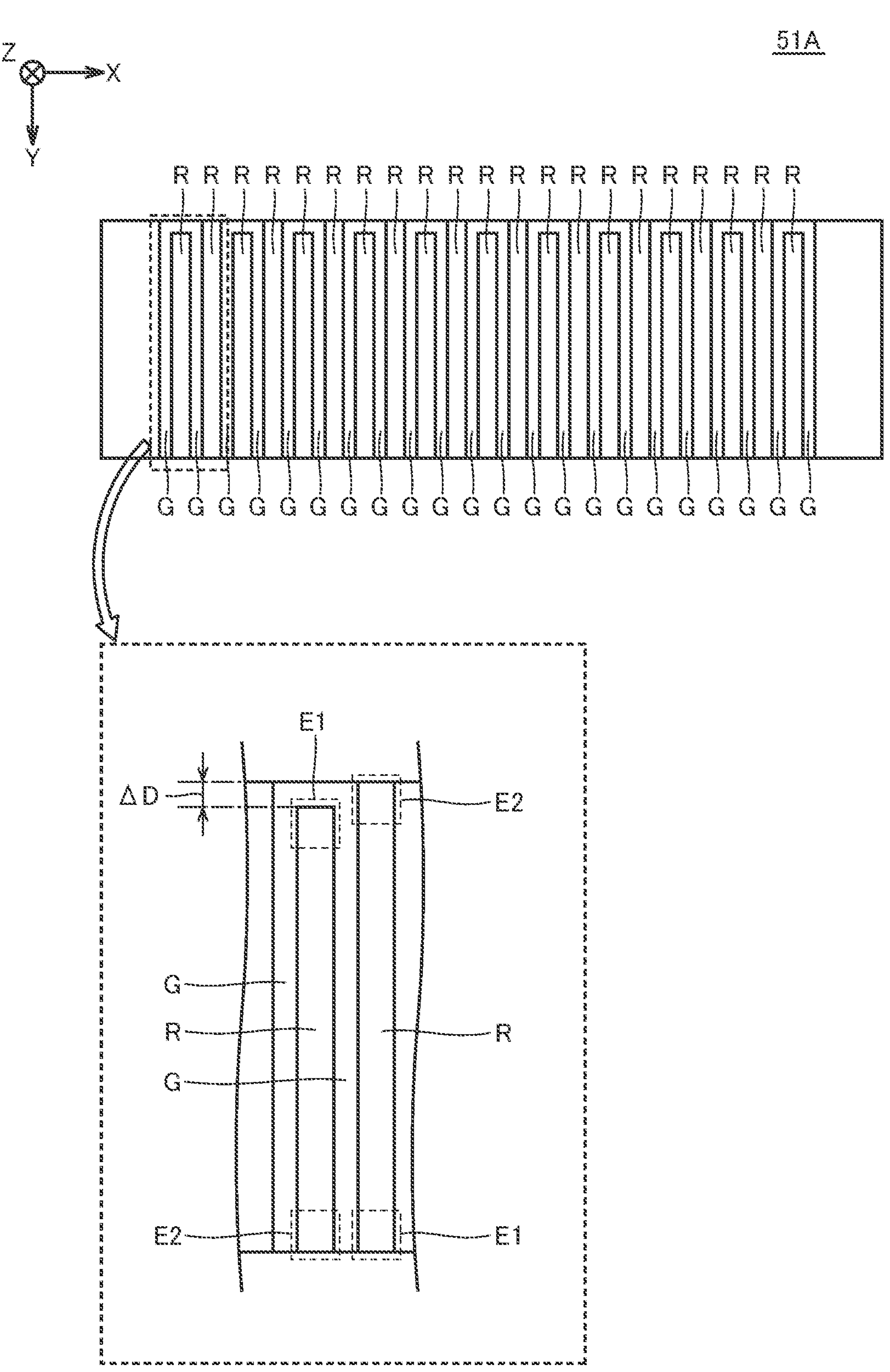
FIG. 10 is a diagram illustrating a slider core according to Variation 1 from the Z-axis direction.

Next, a variation of the above-described slider core 51 will be described with reference to FIG. 10. FIG. 10 is a diagram illustrating a slider core 51A according to Variation 1 from the Z-axis direction.

The end portions E1 of the ridges R shown in FIG. 5 are located inward of the end faces of the slider core 51A on both sides in the Y-axis direction. On the other hand, in the slider core 51A according to the present variation, the end portions E1 are located inward of the end faces of the slider core 51A only on one side in the Y-axis direction.

Even in this case, the bent portions on one side of the cooling pipe 56 can be routed further inward relative to the slider core 51, and the size of the linear motor 100 in the Y-axis direction can be reduced.

E. Variation 2

Figure 11:
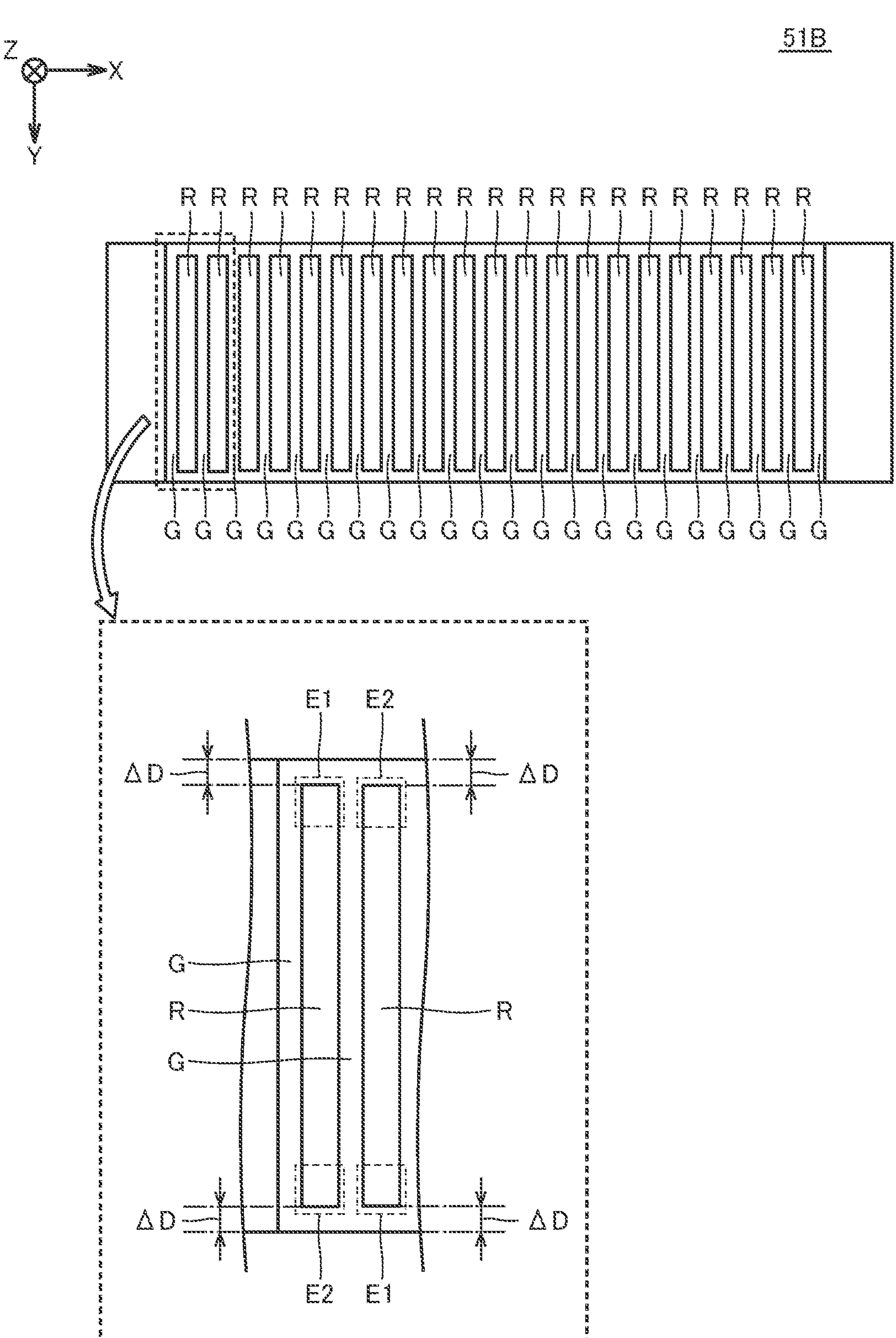
FIG. 11 is a diagram illustrating a slider core according to Variation 2 from the Z-axis direction.

Next, another variation of the above-described slider core 51 will be described with reference to FIG. 11. FIG. 11 is a diagram illustrating a slider core 51B according to Variation 2 from the Z-axis direction.

In the ridges R shown in FIG. 5 described above, the end portions E2 on the side along which the bent portions of the cooling pipe 56 do not extend are not shaved down. On the other hand, in the slider core 51B according to the present variation, the end portions E2 of the ridges R are shaved down.

More specifically, the end portions E2 of the ridges R are located inward of both end faces of the slider 50 in the Y-axis direction. It is preferable that the distance ΔD from the end face of the slider core 51B to each of the end portions E2 is equivalent to the distance ΔD from the end face of the slider core 51B to each of the end portions E1. Accordingly, the shape of the slider core 51B is substantially symmetrical with respect to the X-axis. As a result, the operation of linear motor 100 is stabilized.

F. Variation 3

Figure 12:
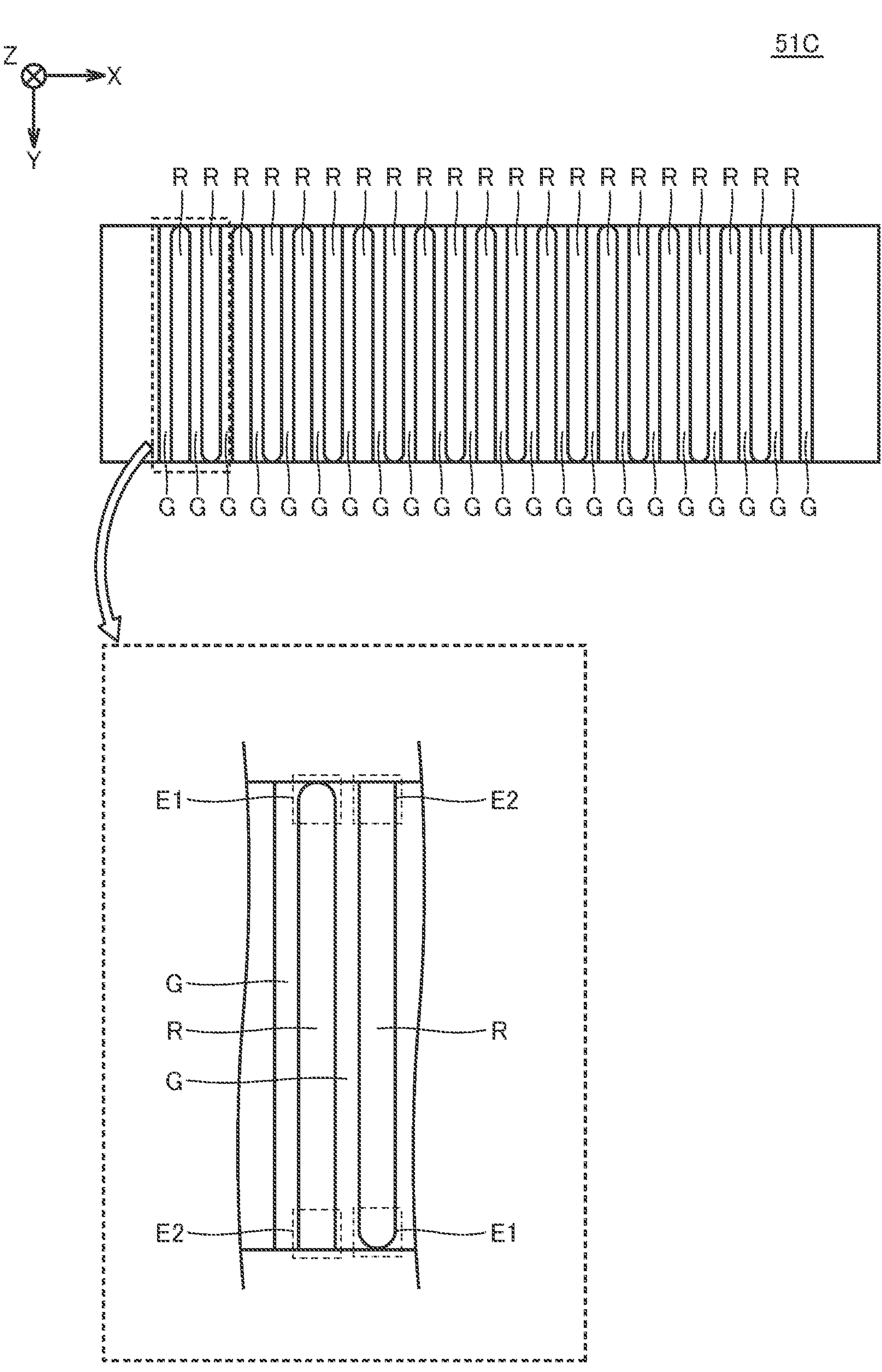
FIG. 12 is a diagram illustrating a slider core according to Variation 3 from the Z-axis direction.

Next, another variation of the above-described slider core 51 will be described with reference to FIG. 12. FIG. 12 is a diagram illustrating a slider core 51C according to Variation 3 from the Z-axis direction.

The end portions E1 of the ridges R shown in FIG. 5 described above are entirely located inward of the two end faces of the slider core 51 in the Y-axis direction. On the other hand, in the slider core 51C according to the present variation, only a portion of each of the end portions E1 in the X-axis direction is located inward of the two end faces.

More specifically, the central portion of the end portion E1 in the X-axis direction is at the same position as the end face of the slider core 51 in the Y-axis direction when viewed in the Z-axis direction. In other words, the central portion is coplanar with the end face of the slider core 51 in the Y-axis direction. On the other hand, the remaining portion of the end portion E1 other the central portion is located inward of the two end faces of the slider core 51 in the Y-axis direction.

Even if portions other than the central portions of the end portions E1 are shaved down in this way, the bent portions of the cooling pipe 56 can be located more inward relative to the slider core 51. As a result, the size of linear motor 100 in the Y-axis direction is reduced.

For example, the end portions E1 are chamfered. It is preferable that each of the end portions E1 is R-chamfered such that the outer peripheral surface extends along the inner peripheral surface of the corresponding bent portion of the cooling pipe 56.

Note that the chamfering method for the end portions E1 is not limited to R chamfering, and other chamfering methods may be employed. For example, the end portions E1 may be C-chamfered.

Also, although an example in which the central portions of the end portions E1 are coplanar with the end face of the slider core 51 is illustrated in FIG. 12, the chamfered end portions E1 may be entirely located inward of the two end faces of the slider core 51 in the Y-axis direction.

G. Preferable Shaving Amount

As described above, the end portions E1 of the ridges R are shaved down by the distance ΔD (see FIG. 5) from the two end faces of the slider 50 in the Y-axis direction so as to be located inward of the end faces. Preferable values of the distance ΔD will be described below with reference to FIGS. 13 and 14.

Figure 13:
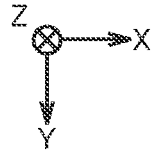
FIG. 13 is a diagram illustrating the cooling pipe from the Z-axis direction.
Figure 13:
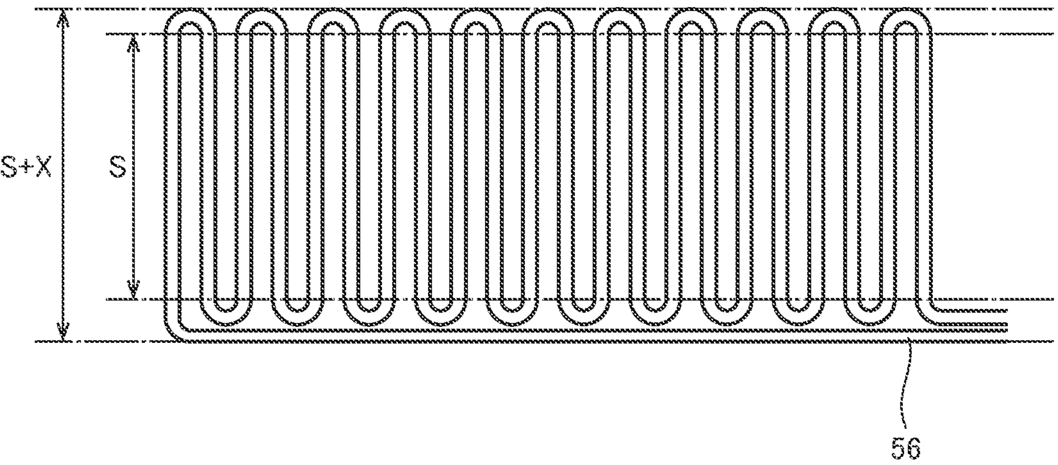
Figure 14:
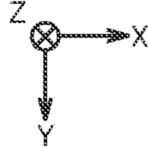
FIG. 14 is a diagram illustrating a coil wound around a tooth from the Z-axis direction.
Figure 14:
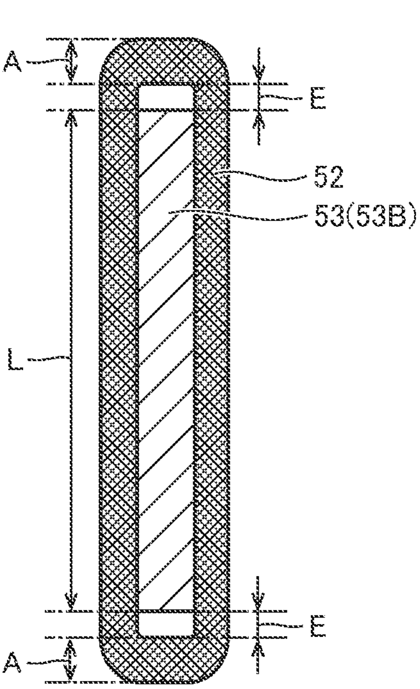

FIG. 13 is a diagram illustrating the above-described cooling pipe 56 from the Z-axis direction. FIG. 14 is a diagram illustrating a coil 52 wound around a tooth 53 from the Z-axis direction.

As shown in FIG. 13, “S” denotes the length of the straight portion of the cooling pipe 56 in the Y-axis direction. Also, “X” denotes the length of the portions of the cooling pipe 56 other than the straight portion. In this case, the total length of the cooling pipe 56 in the Y-axis direction is “S+X”.

As shown in FIG. 14, “L” denotes the length of the slider core 51 in the Y-axis direction is. Here, “L” corresponds to the laminated thickness of the slider core 51. Also, “E” denotes the distance of separation between the tooth 53 and the coil 52 in the Y-axis direction. Furthermore, “L” denotes the length of the slider core 51 in the Y-axis direction. Also, “A” denotes the width of the end portion of the coil 52 in the Y-axis direction.

In order for the cooling pipe 56 to sufficiently cool the coil 52, it is preferable that the width of the cooling pipe 56 in the Y-axis direction is longer than the width of the coil 52 in the Y-axis direction. For this reason, it is preferable that the total length “S+X” of the cooling pipe 56 in the Y-axis direction satisfies the following Expression 1.

$$S+X \geq L+2(A+E) \tag{1}$$

Also, the aforementioned distance ΔD, which corresponds to the ridge R shaving amount, is represented by Expression 2 shown below.

$$\Delta D=(L-S)/2 \tag{2}$$

According to Expressions 1 and 2 above, it is preferable that the distance ΔD satisfies Expression 3 shown below.

$$\Delta D=(L-S)/2 \leq X/2-A-E \tag{3}$$

Accordingly, the width of the cooling pipe 56 in the Y-axis direction is longer than the width of each of the coils 52 in the Y-axis direction. Also, the cooling pipe 56 is shorter by the distance ΔD in the Y-axis direction. As a result, the size of the linear motor 100 in the Y-axis direction is reduced while also maintaining the ability of the cooling pipe 56 to cool the coil 52.

H. Application Examples of Linear Motor 100

Next, application examples of the above-described linear motor 100 will be described with reference to FIGS. 15 to 17. The linear motor 100 can be used to drive various parts in a machine tool, for example.

The term “machine tool” as used herein is a concept that includes various devices that have the function of machining a workpiece. The machine tool 200 may be a horizontal machining center or a vertical machining center. Alternatively, the machine tool 200 may be a lathe, an additive processing machine, or another cutting or grinding machine.

In the case where the linear motor 100 is used in a machine tool, the magnet plate 10, which functions as a stator, is attached to a stationary part in the machine tool. On the other hand, the slider 50, which functions as a mover, is attached to a part that is to be driven in the machine tool. In this case, bolts are inserted through the part to be driven, and the bolts are screwed into the threaded holes formed in the fixing members 58 formed in the slider 50. Accordingly, the part to be driven is fixed to the slider 50.

H1. Spindle

First, an example in which the linear motor 100 is applied to the driving of a spindle will be described with reference to FIG. 15. FIG. 15 is a diagram illustrating an example of the configuration of a machine tool 200.

The linear motor 100 is used to move the position of a spindle 250 for rotatably holding a workpiece or a tool, for example. The spindle 250 may be a work spindle for rotating a workpiece, or may be a tool spindle for rotating a tool.

For convenience in the description, the coordinate system based on the spindle 250 is hereinafter represented by an X' axis, a Y' axis, and a Z' axis. The X' axis, the Y' axis, and the Z' axis are orthogonal to each other.

Figure 15:
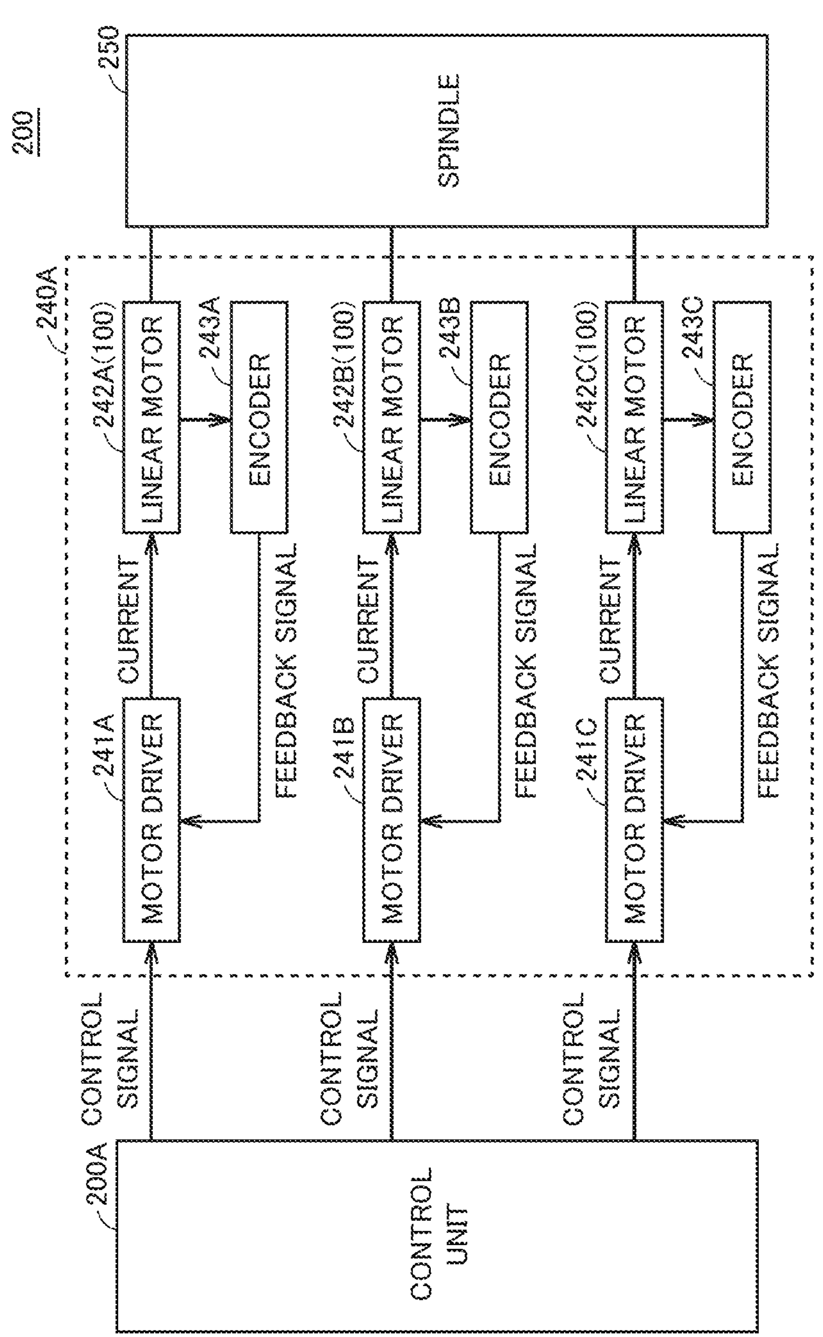
FIG. 15 is a diagram illustrating an example of the device configuration of a machine tool.

As shown in FIG. 15, the machine tool 200 includes a control unit 200A, a drive unit 240A, and the spindle 250.

The control unit 200A is a CNC (Computer Numerical Control) device, for example. The CNC device includes at least one integrated circuit. For example, the integrated circuit is at least one CPU (Central Processing Unit), at least one MPU (Micro Processing Unit), at least one ASIC (Application Specific Integrated Circuit), at least one FPGA (Field Programmable Gate Array), or any combination thereof. The control unit 200A controls the operation of the drive unit 240A by executing various programs such as a machining program.

The drive unit 240A is a mechanism for driving the spindle 250. The drive unit 240A may have any device configuration. The drive unit 240A may be constituted by a single drive unit, or may be constituted by a plurality of drive units. In the example of FIG. 15, the drive unit 240A is constituted by motor drivers 241A to 241C, linear motors 242A to 242C, and encoders 243A to 243C. The linear motors 242A to 242C each correspond to the linear motor 100 described above.

The motor driver 241A controls the driving of the spindle 250 in the X' axis direction. The motor driver 241A receives a control signal from the control unit 200A and outputs a current that corresponds to the control signal to the linear motor 242A.

More specifically, the control unit 200A sequentially outputs control signals that include a target position to the motor driver 241A. The motor driver 241A calculates the actual position of the spindle 250 based on a feedback signal from the encoder 243A, and outputs a current that reduces the difference between the actual position and the target position to the linear motor 242A. Accordingly, the motor driver 241A moves the spindle 250 to a desired position in the X' axis direction.

The motor driver 241B controls the driving of the spindle 250 in the Y' axis direction. The motor driver 241B receives a control signal from the control unit 200A and outputs a current that corresponds to the control signal to the linear motor 242B.

More specifically, the control unit 200A sequentially outputs control signals that include a target position to the motor driver 241B. The motor driver 241B calculates the actual position of the spindle 250 based on a feedback signal from the encoder 243B, and outputs a current that reduces the difference between the actual position and the target position to the linear motor 242B. Accordingly, the motor driver 241B moves the spindle 250 to a desired position in the Y' axis direction.

The motor driver 241C controls the driving of the spindle 250 in the Z' axis direction. The motor driver 241C receives a control signal from the control unit 200A and outputs a current that corresponds to the control signal to the linear motor 242C.

More specifically, the control unit 200A sequentially outputs control signals that include a target position to the motor driver 241C. The motor driver 241C calculates the actual position of the spindle 250 based on a feedback signal from the encoder 243C, and outputs a current that reduces the difference between the actual position and the target position to the linear motor 242C. Accordingly, the motor driver 241C moves the spindle 250 to a desired position in the Z' axis direction.

H2. Table

Next, an example in which the linear motor 100 is applied to the driving of a table will be described with reference to FIG. 16. FIG. 16 is a diagram illustrating another example of the configuration of a machine tool 200.

The linear motor 100 is used to drive a table 260 provided in a machine tool, for example. The table 260 is a stand for placement of a workpiece to be subjected to machining.

Figure 16:
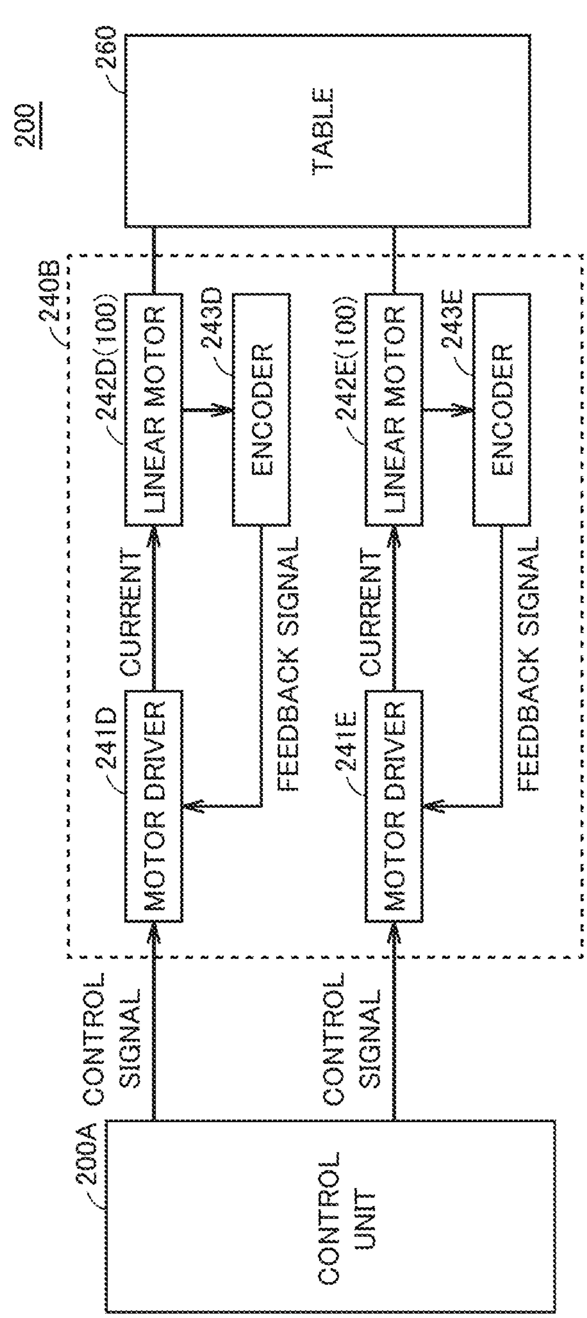
FIG. 16 is a diagram illustrating another example of the device configuration of the machine tool.

As shown in FIG. 16, the machine tool 200 includes a control unit 200A, a drive unit 240B, and the table 260.

The drive unit 240B is a mechanism for driving the table 260. The drive unit 240B may have any device configuration. The drive unit 240B may be constituted by a single drive unit, or may be constituted by a plurality of drive units. In the example of FIG. 16, the drive unit 240B is constituted by motor drivers 241D, 241E, linear motors 242D, 242E, and encoders 243D, 243E. The linear motors 242D, 242E each correspond to the linear motor 100 described above.

The motor driver 241D controls the driving of the table 260 in the X' axis direction. The motor driver 241D receives a control signal from the control unit 200A and outputs a current that corresponds to the control signal to the linear motor 242D.

More specifically, the control unit 200A sequentially outputs control signals that include a target position to the motor driver 241D. The motor driver 241D calculates the actual position of the table 260 based on a feedback signal from the encoder 243D, and outputs a current that reduces the difference between the actual position and the target position to the linear motor 242D. Accordingly, the motor driver 241D moves the table 260 to a desired position in the X' axis direction.

The motor driver 241E controls the driving of the table 260 in the Y' axis direction. The motor driver 241E receives a control signal from the control unit 200A and outputs a current that corresponds to the control signal to the linear motor 242E.

More specifically, the control unit 200A sequentially outputs control signals that include a target position to the motor driver 241E. The motor driver 241E calculates the actual position of the table 260 based on a feedback signal from the encoder 243E, and outputs a current that reduces the difference between the actual position and the target position to the linear motor 242E. Accordingly, the motor driver 241E moves the table 260 to a desired position in the Y' axis direction.

H3. Loader

Next, an example in which the linear motor 100 is applied to the driving of a loader will be described with reference to FIG. 17. FIG. 17 is a diagram illustrating another example of the configuration of a machine tool 200.

The linear motor 100 is used to drive a loader 270 for transporting a member, for example. The member may be a workpiece that has not yet been subjected to machining, a machined workpiece, or a tool.

Figure 17:
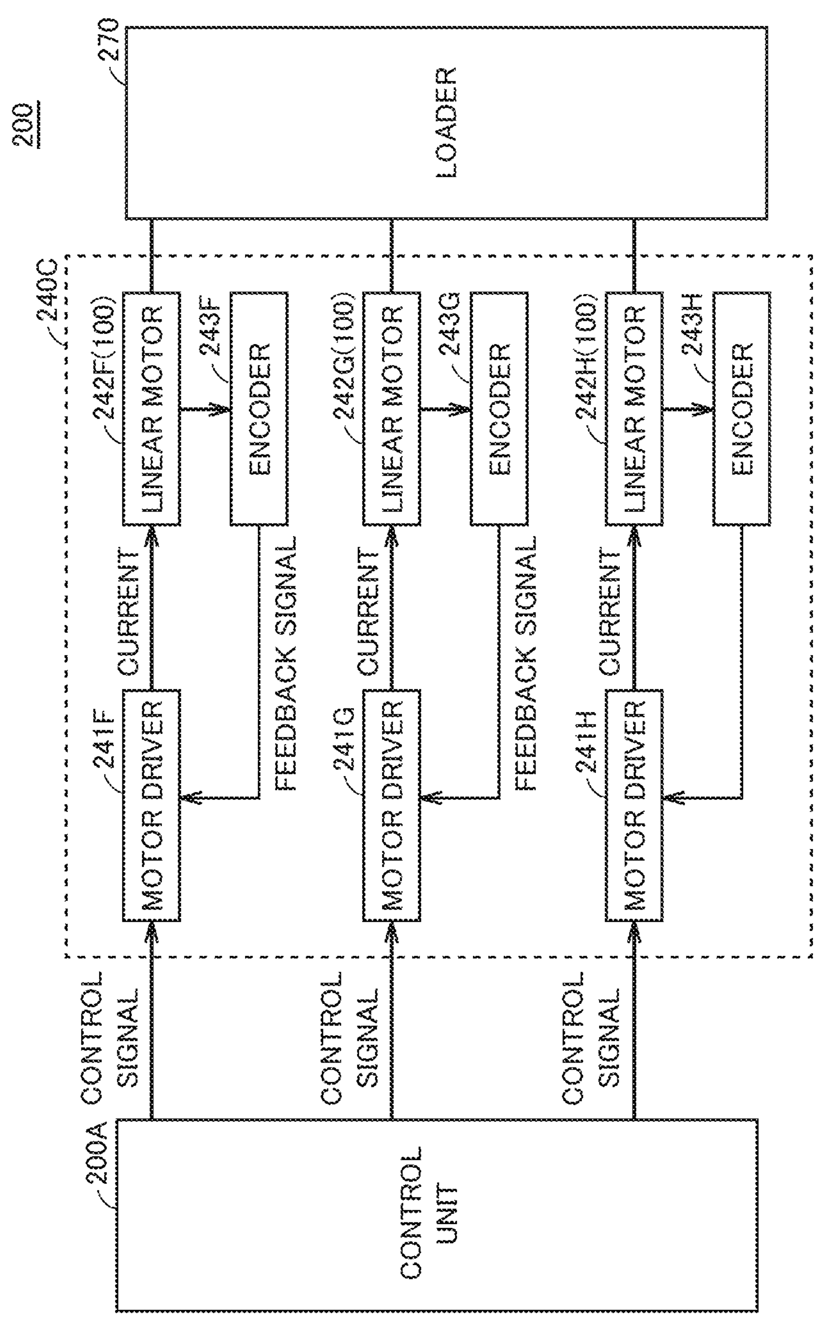
FIG. 17 is a diagram illustrating another example of the device configuration of the machine tool.

As shown in FIG. 17, the machine tool 200 includes a control unit 200A, a drive unit 240C, and the loader 270.

The drive unit 240C is a mechanism for driving the loader 270. The drive unit 240C may have any device configuration. The drive unit 240C may be constituted by a single drive unit, or may be constituted by a plurality of drive units. In the example of FIG. 17, the drive unit 240C is constituted by motor drivers 241F, 241G, 241H, linear motors 242F, 242G, 242H, and encoders 243F, 243G, 243H. The linear motors 242F, 242G, 242H each correspond to the linear motor 100 described above.

The motor driver 241F controls the driving of the loader 270 in the X' axis direction. The motor driver 241F receives a control signal from the control unit 200A and outputs a current that corresponds to the control signal to the linear motor 242F.

More specifically, the control unit 200A sequentially outputs control signals that include a target position to the motor driver 241F. The motor driver 241F calculates the actual position of the loader 270 based on a feedback signal from the encoder 243F, and outputs a current that reduces the difference between the actual position and the target position to the linear motor 242F. Accordingly, the motor driver 241F moves the loader 270 to a desired position in the X' axis direction.

The motor driver 241G controls the driving of the loader 270 in the Y' axis direction. The motor driver 241G receives a control signal from the control unit 200A and outputs a current that corresponds to the control signal to the linear motor 242G.

More specifically, the control unit 200A sequentially outputs control signals that include a target position to the motor driver 241G. The motor driver 241G calculates the actual position of the loader 270 based on a feedback signal from the encoder 243G, and outputs a current that reduces the difference between the actual position and the target position to the linear motor 242G. Accordingly, the motor driver 241G moves the loader 270 to a desired position in the Y' axis direction.

The motor driver 241H controls the driving of the loader 270 in the Z' axis direction. The motor driver 241H receives a control signal from the control unit 200A and outputs a current that corresponds to the control signal to the linear motor 242H.

More specifically, the control unit 200A sequentially outputs control signals that include a target position to the motor driver 241H. The motor driver 241H calculates the actual position of the loader 270 based on a feedback signal from the encoder 243H, and outputs a current that reduces the difference between the actual position and the target position to the linear motor 242H. Accordingly, the motor driver 241H moves the loader 270 to a desired position in the Z' axis direction.

The embodiment disclosed this time is an example in all respects and should be considered to be not restrictive. The scope of the present invention is defined not by the description above but by the claims, and it is intended to include meanings equivalent to the claims and all modifications within the scope.

LIST OF REFERENCE NUMERALS

10 Magnet plate, 12 Magnet, 50 Slider, 51 Slider core, 51A Slider core, 51B Slider core, 51C Slider core, 51X Slider core, 52 Coil, 53 Teeth, 53A Auxiliary teeth, 53B Coil teeth, 56 Cooling pipe, 58 Fixing member, 60 Housing, 100 Linear motor, 200 Machine tool, 200A Control unit, 240A Drive unit, 240B Drive unit, 240C Drive unit, 241A Motor driver, 241B Motor driver, 241C Motor driver, 241D Motor driver, 241E Motor driver, 241F Motor driver, 241G Motor driver, 241H Motor driver, 242A Linear motor, 242B Linear motor, 242C Linear motor, 242D Linear motor, 242E Linear motor, 242F Linear motor, 242G Linear motor, 242H Linear motor, 243A Encoder, 243B Encoder, 243C Encoder, 243D Encoder, 243E Encoder, 243F Encoder, 243G Encoder, 243H Encoder, 250 Spindle, 260 Table, 270 Loader

The invention claimed is:

1. A linear motor for use in a machine tool, the linear motor comprising:

a magnet plate including a plurality of magnets arranged side by side in a first direction;

a slider including a plurality of coils arranged side by side in the first direction, and configured to slide in the first direction relative to the magnet plate, wherein the slider includes a slider core constituted by an electromagnetic steel plate, wherein the slider core includes a surface portion on a side opposite to a side facing the magnet plate; and a cooling pipe provided at the surface portion, wherein the surface portion is provided with a plurality of grooves and a plurality of ridges that alternate in the first direction, the grooves are each elongated in a second direction that is parallel to a surface of the magnet plate and orthogonal to the first direction, the ridges are each elongated in the second direction, the cooling pipe is routed on the slider so as to wind back and forth through the grooves, each of the ridges has two end portions in the second direction including a first end portion on a side along which a bent portion of the cooling pipe extends, and on at least one side in the second direction, each of the first end portions is entirely located inward of two end faces of the slider core in the second direction, or a portion of each of the first end portions, excluding a central portion of the first end portion in the first direction, is located inward of the two end faces of the slider core in the second direction, the two end portions of each of the ridges further include a second end portion on a side along which a bent portion of the cooling pipe does not extend, and the second end portions are each located at the same position as one of the two end faces when viewed in a third direction orthogonal to both the first direction and the second direction.

2. The linear motor according to claim 1, wherein on both sides in the second direction, each of the first end portions is entirely located inward of the two end faces of the slider core in the second direction, or a portion of each of the first end portions, excluding the central portion of the first end portion in the first direction, is located inward of the two end faces of the slider core in the second direction.

3. The linear motor according to claim 1, wherein bent portions of the cooling pipe are located outward of the two end faces when viewed in a third direction orthogonal to both the first direction and the second direction.

4. The linear motor according to claim 1, wherein end portions of the cooling pipe in the second direction overlap end portions of the coil in the second direction when viewed in a third direction orthogonal to both the first direction and the second direction.

5. The linear motor according to claim 1, wherein a width of the cooling pipe in the second direction is longer than a width of each of the coils in the second direction.

6. A machine tool comprising:

the linear motor according to claim 1; and a spindle configured to rotatably hold a workpiece or a tool, wherein the linear motor is used to move a position of the spindle.

7. A machine tool comprising:

the linear motor according to claim 1; and a table on which a workpiece is placeable, wherein the linear motor is used to drive the table.

8. A machine tool comprising:

the linear motor according to claim 1; and a loader configured to transport a member, wherein the linear motor is used to drive the loader.

9. A linear motor for use in a machine tool, the linear motor comprising:

a magnet plate including a plurality of magnets arranged side by side in a first direction;

a slider including a plurality of coils arranged side by side in the first direction, and configured to slide in the first direction relative to the magnet plate; and a cooling pipe provided at a surface portion of the slider on a side opposite to a side facing the magnet plate, wherein the surface portion is provided with a plurality of grooves and a plurality of ridges that alternate in the first direction, the grooves are each elongated in a second direction that is parallel to a surface of the magnet plate and orthogonal to the first direction, the ridges are each elongated in the second direction, the cooling pipe is routed on the slider so as to wind back and forth through the grooves, each of the ridges has two end portions in the second direction including a first end portion on a side along which a bent portion of the cooling pipe extends, and on at least one side in the second direction, each of the first end portions is entirely located inward of two end faces of the slider in the second direction, or a portion of each of the first end portions, excluding a central portion of the first end portion in the first direction, is located inward of the two end faces of the slider in the second direction, the two end portions of each of the ridges further include a second end portion on a side along which a bent portion of the cooling pipe does not extend, and the second end portions are each located at the same position as one of the two end faces when viewed in a third direction orthogonal to both the first direction and the second direction.

* * * * *